United States Patent [19]

Pennington

[11] E Patent Number: Re. 32,662

[45] Reissued Date of Patent: May 3, 1988

[54] IMAGE PROJECTING AMUSEMENT DEVICE

[75] Inventor: Hugh S. Pennington, Wilmington, Del.

[73] Assignee: David R. Capasso, Killingworth, Conn.

[21] Appl. No.: 580,447

[22] Filed: Feb. 15, 1984

Related U.S. Patent Documents

Reissue of:

[64] Patent No.: 4,322,080
Issued: Mar. 30, 1982
Appl. No.: 132,092
Filed: Mar. 20, 1980

[51] Int. Cl.[4] ..... A63F 9/14; F41J 5/02

[52] U.S. Cl. ..... 273/86 B; 273/311; 273/312; 273/358

[58] Field of Search ..... 273/86 R, 86 B, 310, 273/311, 312, 313, 316, 358, DIG. 28; 434/20, 21, 22

[56] References Cited

U.S. PATENT DOCUMENTS

| | | | |
|---|---|---|---|
| 2,188,263 | 1/1940 | Eisenberg . | |
| 2,456,828 | 12/1948 | Hawe . | |
| 2,502,834 | 4/1950 | Dreyer . | |
| 2,516,319 | 7/1950 | Hooker | 273/312 |
| 2,629,598 | 2/1953 | Hooker . | |
| 3,271,032 | 9/1956 | Rabinowitz et al. . | |
| 3,499,650 | 7/1959 | Lemelson . | |
| 3,549,147 | 12/1970 | Katter et al. | 273/312 |
| 3,748,751 | 7/1973 | Breglia et al. | 273/311 X |
| 3,777,410 | 12/1973 | Robinson | 273/85 G X |
| 3,815,913 | 6/1974 | Wren et al. | 273/316 |
| 3,911,598 | 10/1975 | Mohon . | |
| 3,918,714 | 11/1975 | Ceccaroni | 273/310 |
| 3,960,380 | 6/1976 | Yokoi . | |
| 4,086,711 | 5/1978 | Gammarino . | |
| 4,148,485 | 4/1979 | Rains | 273/DIG. 28 X |
| 4,171,811 | 10/1979 | Meyer et al. | 273/312 X |
| 4,205,847 | 6/1980 | Steiger et al. | 273/313 |
| 4,262,908 | 4/1981 | Budmiger | 273/310 |

*Primary Examiner*—Anton O. Oechsle
*Attorney, Agent, or Firm*—Fitzpatrick, Cella, Harper & Scinto

[57] ABSTRACT

A amusement device includes a target in the form of a course having an obstacle wherein the course is of a predetermined light intensity and the obstacle is of a differing light intensity. An image of a moving object is projected on the target and is controlled by the player who would attempt to move the image over the course without contacting the obstacle. Light intensity sensing means are provided movable with the image to detect when the obstacle has been contacted.

27 Claims, 2 Drawing Sheets

IMAGE PROJECTING AMUSEMENT DEVICE

Matter enclosed in heavy brackets [ ] appears in the original patent but forms no part of this reissue specification; matter printed in italics indicates the additions made by reissue.

BACKGROUND OF INVENTION

This invention relates to an amusement device such as an electronic amusement device wherein there is movement of an image of an object upon a target. With such device it would be highly desirable to provide the player with control over the movement of the object image to enhance his enjoyment thereof. Additionally it would be desirable if effective means could be provided for sensing when the object image has not been properly moved such as by the object image contacting an obstacle. It is also desirable to provide such type of an amusement device which can simultaneously be played by more than one player.

Various devices exist such as exemplified in U.S. Pat. Nos. 4,086,711, 2,502,834 and 2,456,828 wherein a player attempts to project or control an image on a target.

SUMMARY OF INVENTION

An object of this invention is to [project] *provide* an amusement device of the above type.

A further object of this invention is to provide such an amusement device wherein the target may be in the form of a course having an obstacle which is to be avoided by the moving object image.

A still further object of this invention is to provide such an amusement device which is capable of simultaneously being played by more than one player.

In accordance with this invention a target is provided in the form of a course with an obstacle. The course and obstacle are of a differing predetermined light intensity. Means are provided for projecting an image of a moving object on the target so that the player may control movement of the object image and attempt to avoid the object image contacting the obstacle. Light intensity sensing means are provided movable with the image of the object to detect when the obstacle has been contacted.

In an advantageous form of this invention the course may be, for example, a track with the obstacle being the boundary around the track. In such embodiment a suitable image of an object such as a simulated car may be controlled by the player, and the light intensity sensing means may detect the change in light intensity of the boundary when the car image is superimposed over the boundary because the car image goes off the track.

The above type device may also include means to accommodate a second player. The second player may have a similar device wherein the second player likewise controls the movements of a further object image or car. Either or both players may also have means such as a simulated gun for attempting to shoot the other player's object while either or both players moves his object around the track. Likewise more players can be included with more devices.

THE DRAWINGS

Figure 2:
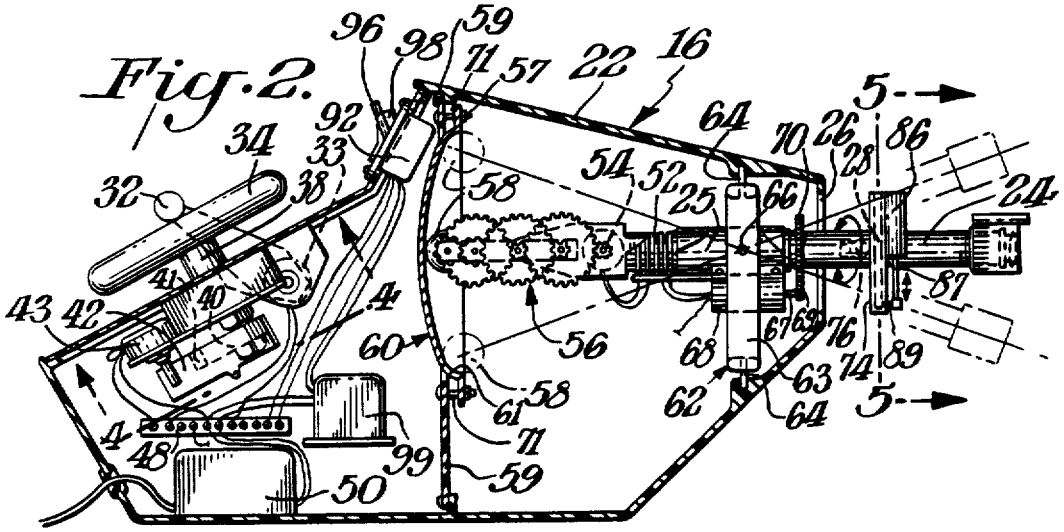
FIG. 2 is a cross-sectional view in elevation taken through FIG. 1 along the line 2—2.
Figure 4:
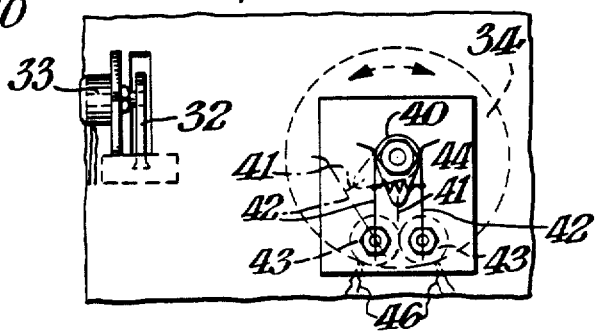
Figure 5:
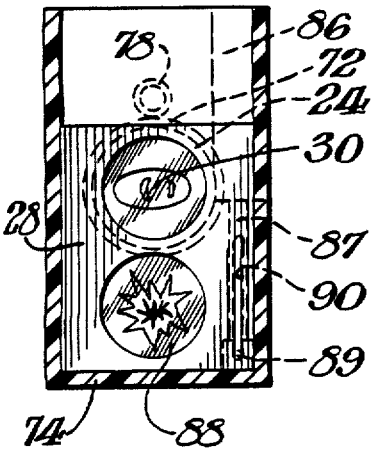
Figure 6:
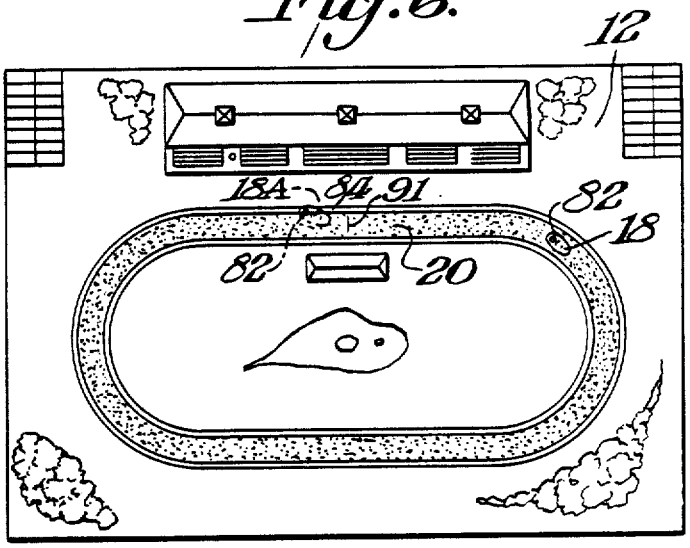
Figure 4A:
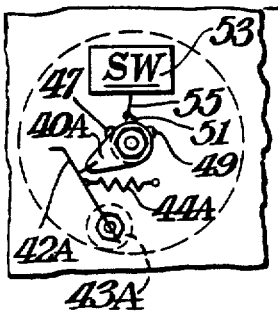
Figure 7:
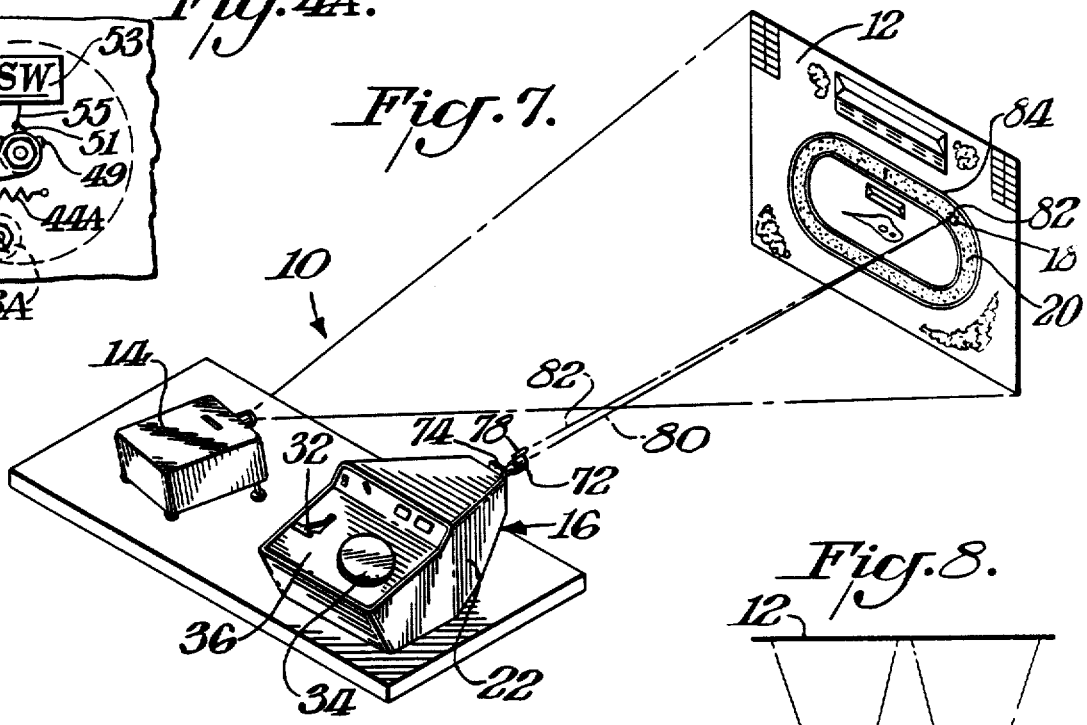
Figure 8:
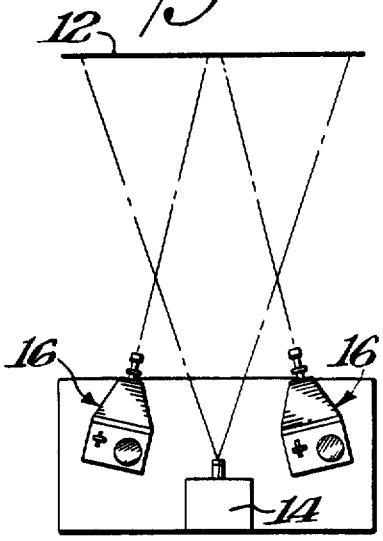
Figure 9:
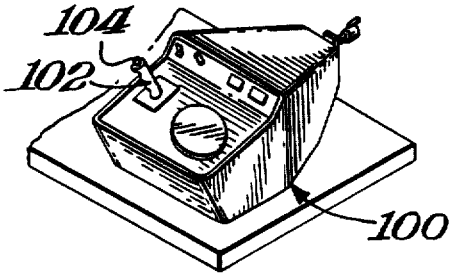

FIGS. 4 and 5 are cross-sectional views taken through FIG. 2 along the lines 4—4 and 5—5, respectively;

FIG. 4A is a view similar to FIG. 4 showing an alternative arrangement;

FIG. 6 is a front elevation view of a typical target [unable] *usable* with the amusement device of FIGS. 1–5;

FIG. 7 is a perspective view showing the amusement device of FIGS. 1–6;

FIG. 8 is a top plan view schematically illustrating an alternative form of this invention wherein more than one player may simultaneously play; and FIG. 9 is a perspective view of yet another embodiment of this invention.

DETAILED DESCRIPTION

FIG. 7 illustrates an amusement device 10 in accordance with this invention. As indicated therein, a target 12 is projected on a screen from any suitable means such as a conventional slide projector 14 or an 8 mm movie camera. Target 12 may even be a permanent screen rather than a projected target. Amusement device 10 further includes a player control mechanism 16 by means of which the player may control movement of an image of an object 18 around, for example, a track 20 on target 12, as also shown in FIG. 6.

FIGS. 1–5 illustrate the details of a player control mechanism 16. As indicated therein, a housing 22 is provided having a cylinder or barrel 24 extending outwardly from the front face 26 thereof. Barrel 24 includes a simulated object 30 on a slide 28 as shown in FIG. 5. The simulated object 30 may be of any suitable form such as, for example, a car, a horse or any other simulated object generally used for racing. It is to be understood that the invention is not limited to any specific object or, indeed, to racing but in its broad aspects may be practiced by testing the skill of a player in moving any type of object on a target and avoiding obstacles on the target.

Barrel 24 is mounted for rotational movement about its own axis so as to effect a turning movement of the object, and barrel 24 is also capable of a pivotal movement as later described which effects a linear movement of object 18 on target 12. Mechanism 16 also includes means for controlling the speed of movement of [target] *object* 18. FIG. 17 for example, illustrates rotation or turning control wheel 34 and linear direction control lever 32 on the inclined top face 36 of housing 22 for manual control by the player.

Figure 1:
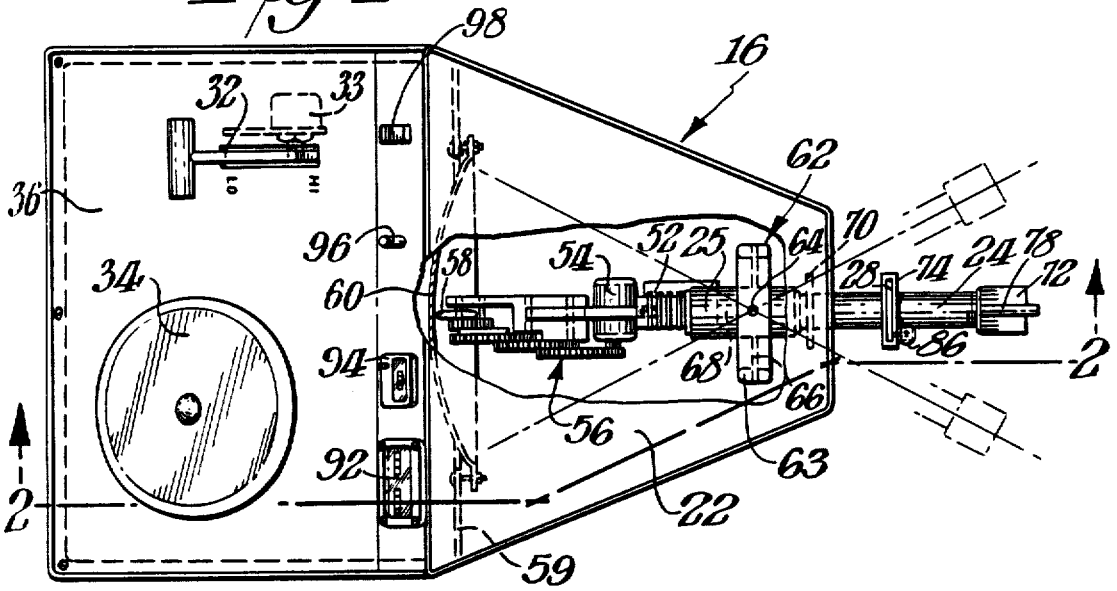
FIG. 1 is a top plan view partly broken away and in section of a portion of an amusement device in accordance with this invention.

Before discussing the combined operation of turning control wheel 34 and linear control lever 32, reference is made to FIGS. 1–2 for a discussion of how the linear and turning movements are effected to object 18.

As shown in FIGS. 1 and 2, linear drive motor 54 drives a gear train 56 having, for example, drive reduction gearing for reducing the speed input from motor 54. Gear train 56 terminates in and drives a friction wheel 58. Friction wheel 58 which may be rubber covered presses against guide surface 60. Actuation of gear train 56 by motor 54 causes friction or drive wheel 58 to rotate and move against guide surface 60 and move in a linear path in accordance with the orientation of drive wheel 58.

Figure 3:
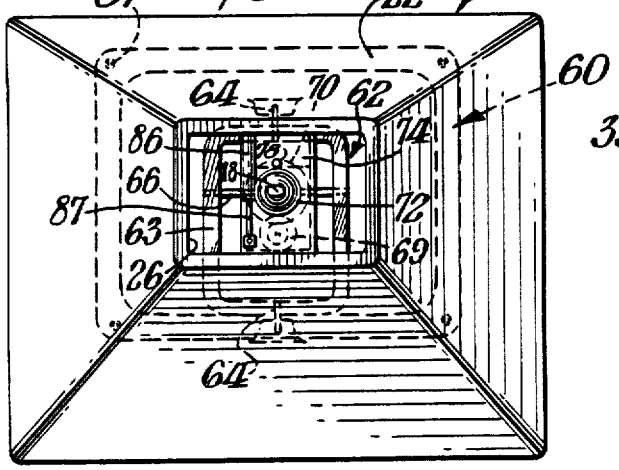
FIG. 3 is a front elevation view of the amusement device shown in FIGS. 1–2.

Cylinder or barrel 24 is universally mounted. As best shown in FIG. 3, for example, a gimbal-type arrangement 62 is used for mounting the barrel or cylinder assembly which includes the various motors and gears. Gimbal arrangement 62 includes, for example, a frame 63 mounted for rotation about vertical pivot pins 64 with a pair of horizontal pivot pins 66 mounted to sleeve 25 around the barrel 24 so that the assembly can pivot about both a vertical axis and a horizontal axis to thereby achieve the universal mounting. Thus as friction wheel 58 rolls against guide surface 60, the entire cylinder assembly is pivoted in the universal mounting. The movement of friction wheel 58 across guide surface 60 would be linear and the linear movement would be translated into a linear movement of the object image 18. The speed of movement is controlled by the position of lever 32 which controls the current to motor 54. Lever 32 has associated with it a potentiometer 33 and thus acts as a throttle for motor 54 to which it is connected by suitable circuitry through terminal strip 48 which in turn is electrically connected to commutator 52 for powering motor 54.

As illustrated in the drawings, wheel 34 is mounted on a shaft 38 which extends through face or plate 36 which acts as a control panel. As best shown in FIG. 4, a cam 40 is mounted on shaft 38 for jointly rotating with wheel 34. Cam 40 acts as a double poled switch with its contact member 41 and is disposed between two electrical contact plates 42 which are spring biased toward each other by any suitable means such as spring 44. Each contact plate is associated with a potentiometer 43. The position or degree of rotation of wheel 34 thus controls the position of cam 40 which in turn controls the degree of [speed] *spread* of contact plates 42. FIG. 4, for example, illustrates in solid lines one position of cam 40 where there is no spread of contact plates 42 in the off position. FIG. 4 also illustrates by phantom lines a different position during operation. Contact plates 42 are connected by any suitable electrical leads 46 to a suitable terminal strip 48 (FIG. 2) connected to the source of power 50 such as a transformer. Suitable electrical lines also lead from terminal strip 48 to reversible motor 68 which may be a three volt DC motor. The position of cam 40 thus controls the amount of current to motor 68 as well as the direction of rotation of motor shaft 67.

FIG. 4A shows an alternative arrangement for controlling the speed and direction of motor shaft 67. As indicated therein, only a single contact plate 42A is provided with its associated potentiometer 43A and is resiliently biassed by spring 44A toward cam 40A. In this embodiment, cam 40A contacting plate 42A determines the amount of current to motor 68. The direction of motor 68, however, is controlled by a double pole triple throw switch arrangement which includes, for example, a pair of actuating lugs 47, 49 of opposite polarity with an intermediate lug 51 on shaft 38. Switch 53 is mounted at a suitable location in housing 22 with its contact arm 55 disposed in the path of movement of lugs 47, 49, 51 as shaft 38 is rotated by wheel 34. If lug 47 is contacted, motor shaft 67 will rotate in one direction but rotate in the opposite direction when lug 49 is contacted. The neutral or off position results when lug 51 is contacted.

Actuation of motor 68 causes its shaft 67 to rotate drive gear 69 which in turn rotates gear 70 on barrel or cylinder 24 so that the entire cylinder assembly turns or rotates. Such rotation in turn changes the orientation of friction or drive wheel 58 thereby changing the direction of the moving object image. The player could accordingly control the precise path of movement of the object image by manipulating linear movement lever 32 and rotation control wheel 34. For example, if a gradual turn is desired, wheel 34 would be rotated only slightly thereby supplying minimal current to turning motor 68. A sharp arc could be achieved, however, by a greater turn of wheel 34 to cause a greater surge of current to motor 68. Similarly, as previously described, the speed of linear movement of friction wheel 58 could be altered in accordance with the positioning of lever 32 between high and low positions.

Although the linear control permits movement in only one direction, the object could be moved in the reverse direction by manipulation of the turning control about 180°.

Means are provided in order to assure engagement of guide surface 60 and friction or drive wheel 58. FIG. 2, for example, illustrates guide surface 60 to be mounted to flanges or plates 59 within housing 22 by means of, for example, conventional threaded fasteners 57. The mounting, however, is spring loaded through the utilization of springs 71 mounted on the fasteners to urge guide surface or plate 60 forwardly toward and in contact with friction wheel 58. In the preferred illustrated form of this invention, guide surface 60 is a spherical segment contoured at a radius corresponding to the length of the barrel assembly from its pivot point at gimbal 62 to the edge of friction wheel 58. The plate 60 may, however, also be a flat plate or other arcuate plate which is resiliently urged in contact with friction wheel 58. Guide surface or plate 60 may also include a peripheral rim 61 which acts as a stop to prevent friction wheel 58 from riding off the guide surface 60.

The details of projecting the object image are illustrated, for example, in [FIG.] *FIGS. 1 and* 2. As indicated therein, image focusing lens 72 is mounted at the front end of barrel or cylinder 24 with the actual simulated object being mounted on slide 28 in image housing 74. A source of light, such as a bulb 76, is provided in back of image housing 74 so that the illuminated image is provided through lens 72 on target or screen 12 in a known manner. Advantageously slide 28 is detachably mounted so that it can be replaced by any simulated object such as a car, animal, plane, man, etc.

The various Figures illustrate another novel aspect of this invention, namely the incorporation of a sensor particularly a photo sensing device such as photocell 78 mounted to barrel 24 so that sensor 78 moves jointly with the movement of the simulated object. FIG. 7, for example, illustrates the beam 80 of the image being projected from control mechanism 16 to target 12 while line 82 indicates the beam or path taken or viewed by sensor 78 so that both paths generally coincide on target 12. Note FIG. 6 where the path 82 is shown as superimposed on image 18. Sensor 78 is utilized to detect, for example, a change in light intensity and thereby sense the happening of a certain event. For example, in the illustrated embodiment, target 12 includes a track 20 which may be, for example, of a relatively dark color with the boundary 84 being, for example, white or relatively light. While car 18 moves around track 20, sensor 78 detects or senses the normal light intensity condition. If, however, the car moves off the track, as indicated in FIG. 6 by car image 18A, a change in light intensity condition is detected by sensor 78, and through proper circuitry, this change in light intensity could be used to actuate any suitable signal. FIGS. 2 and 5, for example, illustrate slide 28 to be connected to a solenoid 86 which would be actuated by sensor 78 detecting the car hitting boundary 84. When solenoid 86 is actuated its arm 87 would move and arm 87 is connected by pin 89 to slide 28 through slot 90 in housing 74 so that slide 28 would be moved from the position wherein the object is in line with the lens under normal conditions to a position where, for example, a simulated explosion 88 would be moved in the line of projection. Sensor 78 could also be utilized to actuate a signal such as an alarm or flashing light and, as later described, sensor 78 may be utilized to actuate a form of scoring.

If desired, track 20 may also include a starting line 91 of a different light intensity than the track, and an additional sensor may be permanently focused on starting line 91. Such additional sensor may be actuated whenever the car passes over starting line 91 at the completion of a cycle which in turn would change the light intensity. The cycles sensing may be counted as a further means for keeping score.

It should be appreciated that any type of suitable circuitry may be used to carry out the concepts of this invention, and similarly any other ancillary device can be used to enhance the playing of the amusement device. For example, terminal strip 48 may include suitable electrical leads which are connected to counter 92 (FIG. 1), a timer 94, a reset control 96 and an off/on switch 98 connected through relay 99 to terminal strip 48 to control the current to the motors. Thus, for example, the position of off/on switch 98 would determine whether or not power is provided to terminal strip 48. For commercial use, the off/on switch may be coin actuated. Where the device is used for simulating a race, it would be desirable to begin at the starting line 91, and where a score is being kept, the score should begin at zero. These starting conditions would be controlled by reset switch 96. It is within the concepts of this invention to also utilize amusement device 10 in a manner where the player is not only concerned with avoiding obstacles but is also concerned with playing against a time limit, and this time control function is achieved through timer 94.

As previously indicated, device 10 includes counter 92 which could count, for example, the number of cycles completed in going around the track and/or the number of hits or times the simulated object has contacted an obstacle. Other conventional means of keeping score may also be used as indicated by counter 62.

The concepts of this invention may also be practiced by employing a second player. In one such practice of this invention each player would have an identical control mechanism 16 illustrated in FIG. 8, and the players could simply race against each other to determine, for example, which player can complete the course without hitting the boundary or which player can complete the most cycles without hitting the boundary.

The invention may also be practiced as in FIG. 9 where a second player projects a beam of light simulating a gun which would attempt to strike or shoot the object image racing around the track by the first player. A strike by the light ray contacting the car 18 would be detected by sensor 78 much the same as sensor 78 senses the car 18 crashing into the boundary 84. To add more realism, the light beam from the second player might be an interrupted light beam with noise simulating the shooting of a gun. Control of the light beam could be through a control mechanism 100 having a universally mounted joy stick 102 with an actuating button 104. Any suitable means could be employed for such control means. Actuation of button 104 could also result in a shooting type noise.

The invention may also be practiced with each player having his own gun on the object image control mechanism so that the player would not only be concerned with safely driving his car around the course but also with attempting to shoot the opponent's car.

Although the invention has been particularly described with the object image as a race car, the concepts of this invention lend themselves to other practices. For example, instead of a light projector projecting a race track target, a movie projector might be utilized to project an air scene which could include, for example, meteors or air obstacles such as planes and the moving image might be a plane or spaceship.

For realism, target 12 would include typical appropriate scenery. Additionally while a race track is desirable as a means of playing the amusement device, the concepts may be practiced with other goals in mind. For example, the image object might be a man and the target might be a jungle scene wherein the safe path is of one predetermined light intensity and obstacles are animals, falling trees, etc. of differing light intensity and the object would be to guide the man through the jungle to an area of safety. Similarly the course or safe path need not be a symmetrical path such as track 20 but could be a winding or irregular road which a car, or tank or other type object would have to traverse.

What is claimed is:

1. An amusement device comprising a target in the form of a course and at least one obstacle, said course being of a predetermined light intensity and said obstacles being of predetermined differing light intensities, means for projecting an image of a moving object on said target, said image having a recognizable orientation, means for controlling the movement of said image of said object on said target whereby a player may attempt to guide said image of said object over said course by said image of said object being superimposed over said course and said player may attempt to avoid said image of said object contacting said obstacles by said image of said object being superimposed on said obstacles, said movement controlling means including linear movement control means and turning movement control means for selectively moving said image on said course and for permitting the orientation of said image to be changed while said image is being moved linearly, light intensity sensing means movable with said image of said object for detecting when said image of said object has superimposed any of said obstacles, and indicating means for indicating when said image of said object has superimposed said obstacles.

2. The device of claim 1 wherein said course is a track of dark color and said obstacles include a lightly colored boundary around said track.

3. The device of claim 2 wherein said target is projected on a screen.

4. The device of claim 1 wherein said image projecting means includes a barrel mounted in front of said target and having a lens therein and having its longitudinal axis in line with said target, a light source in said barrel, and a simulated object in said barrel between said lens and said light source.

5. The device of claim 4 including a housing, said barrel extending through an opening in the front face of said housing, universal mounting means mounting said barrel in said housing, said linear movement control means including means for pivoting said barrel along a path, and said turning movement means including means for rotating said barrel to change the direction of said path.

6. The device of claim 6 wherein said means for pivoting said barrel includes a linear movement motor mounted to said barrel, a gear train driven by said linear movement motor, a friction wheel driven by said gear train, a guide surface in said housing, and said friction wheel being in contact with said guide surface whereby actuation of said linear movement motor causes said friction wheel to move across said guide surface to thereby cause said barrel to move.

7. The device of claim 6 including resilient means urging said guide surface into contacct with said friction wheel.

8. The device of claim 6 wherein said guide surface is a spherical segment plate.

9. The device of claim 6 wherein said turning movement control means includes a reversible turning movement motor for controlling the direction of rotation of said barrel, a control wheel mounted externally of said housing, said control wheel being mounted for rotation on a shaft extending through said housing, a cam mounted on said shaft in said housing, at least one resiliently mounted contact plate in the path of movement of said cam for controlling the amount of current to said turning motor, a double poled switch arrangement associated with said cam for controlling the direction of rotation of the shaft of said turning movement motor, and gear means mounted to said barrel driven by said turning movement motor shaft for rotating said barrel.

10. The device of claim 6 wherein said linear movement means further comprises a control lever mounted externally of said housing for controlling the amount of current supplied to said linear movement motor.

11. The device of claim 4 wherein said sensing means is mounted to said barrel for joint movement therewith.

12. The device of claim 11 wherein said simulated object is on an image plate removably mounted in an image housing on said barrel.

13. The device of claim 12 including a further object on said image plate simulating a scene representative of said obstacle being contacted, and means for moving said further object between said light source and said lens for projecting its image on said target.

14. The device of claim 13 wherein said sensing means is a photocell, and said further object moving means being a solenoid connected to said image plate and controlled by said photocell.

15. The device of claim 5 wherein said housing includes an external control panel, said turning movement means including a control wheel on said control panel, said linear movement means including a control throttle lever on said control panel, an off/on switch on said control panel, reset means on said control panel, timing means on said control panel, and a score indicating counter on said control panel.

16. The device of claim 1 wherein said means for controlling said image movement is mounted on a first housing for use by a first player, and a second housing having movable image projecting means for use by a second player projecting a respective image on said target.

17. The device of claim 16 wherein said second housing image projecting means projects a light beam on said target.

18. The device of claim 16 wherein said second housing image projecting means is a further image movement means similar to said image movement means of the first housing whereby each player may race the other player.

19. The device of claim 18 wherein each of said housings further includes means for projecting a light beam on said target.

20. The device of claim 19 wherein said light beam is interrupted for simulating the shooting of a gun.

*21. An amusement device comprising:*

*means providing a viewing surface;*

*means for projecting a target image onto said viewing surface, said target image including a background course having a first predetermined light intensity and at least one obstacle having a second predetermined light intensity, one of said first and second light intensities being relatively high and the other thereof being relatively low;* means for selectively and controllably projecting an object image onto said viewing surface to be located at any position on said target image, said object image having a third predetermined light intensity;

*means for sensing the light intensity at any position on said target image to which said object image is projected and thereby sensing superimposition of said object image on said background course by sensing the combined first and third light intensities and sensing superimposition of said object image on any said obstacle by sensing the combined second and third light intensities; and*

*indicating means connected to said sensing means for detecting a change in light intensity sensed thereby and for producing an indication when said sensing means senses said combined second and third light intensities representing superimposition of said object image and any said obstacle image but for not producing an indication when said sensing means senses said combined first and third light intensities representing superimposition of said object image and said background course.*

*22. The device of claim 21, wherein said target image projecting means provides relative movement between said background course and said obstacles within said target image.*

*23. The device of claim 21, wherein said object image projecting means is capable of movement to selectively and controllably project said object image onto said target image and wherein said sensing means is mounted for movement coordinated with movement of said object image projecting means to constantly receive light from said object image projected onto said target.*

*24. The device of claim 23, wherein said sensing means is mounted on said object image projecting means for movement therewith.*

*25. The device of claim 21, wherein said indicating means comprises means simulating an explosion when said sensing means senses said combined second and third light intensities.*

*26. The device of claim 25, wherein said explosion simulating means comprises means for projectig the image of an explosion to said surface.*

*27. The device of claim 21, wherein indicating means comprises means for producing an alarm signal when said sensing means senses combined second and third light intensities.*

* * * * *